US009840202B1

(12) United States Patent
Ranga et al.

(10) Patent No.: US 9,840,202 B1
(45) Date of Patent: Dec. 12, 2017

(54) MOTOR VEHICLE HYBRID SHELF ASSEMBLY

(71) Applicant: Dura Operating, LLC, Auburn Hills, MI (US)

(72) Inventors: Suhant Prajwal Reddy Ranga, Northville, MI (US); Alex Mark Langreet, Mount Clemens, MI (US)

(73) Assignee: DURA Operating, LLC, Auburn Hills, MI (US)

(*) Notice: Subject to any disclaimer, the term of this patent is extended or adjusted under 35 U.S.C. 154(b) by 0 days.

(21) Appl. No.: 15/613,654

(22) Filed: Jun. 5, 2017

Related U.S. Application Data

(63) Continuation of application No. 15/178,145, filed on Jun. 9, 2016, now Pat. No. 9,701,250.

(51) Int. Cl.
*B60R 5/04* (2006.01)
*B60R 11/02* (2006.01)
*B62D 25/08* (2006.01)

(52) U.S. Cl.
CPC .......... *B60R 5/044* (2013.01); *B60R 11/0223* (2013.01); *B62D 25/087* (2013.01)

(58) Field of Classification Search
CPC .... B60R 11/0223; B60R 5/044; B62D 25/087
USPC ......................................... 296/24.44, 193.02
See application file for complete search history.

(56) References Cited

U.S. PATENT DOCUMENTS

| | | | | |
|---|---|---|---|---|
| 6,241,309 B1* | 6/2001 | Roehl | .................. | B62D 25/087 296/198 |
| 6,808,228 B1* | 10/2004 | Campbell | ............ | B62D 25/087 296/187.11 |
| 6,851,246 B2* | 2/2005 | Laurent | ................ | B62D 29/001 293/102 |
| 6,983,971 B2* | 1/2006 | Broadhead | .............. | B60R 5/044 296/193.04 |
| 7,063,811 B2* | 6/2006 | Brozenick | ........... | B29C 37/0085 264/267 |
| 8,191,959 B2* | 6/2012 | Ritz | ...................... | B62D 25/084 296/187.09 |
| 9,248,781 B2* | 2/2016 | Oppliger | ................. | B60R 5/044 |
| 9,598,123 B1* | 3/2017 | Tavakoli-Targhi | .... | B62D 43/10 |
| 9,630,567 B1* | 4/2017 | Shahidi | ............... | B60R 11/0217 |
| 2007/0075568 A1* | 4/2007 | Kim | ..................... | B60R 11/0217 296/193.08 |
| 2017/0088094 A1* | 3/2017 | Hillman | .............. | B60R 11/0217 |

* cited by examiner

*Primary Examiner* — Jason S Morrow
(74) *Attorney, Agent, or Firm* — Robert Ford; Steven L. Crane; Raymond J. Vivacqua

(57) ABSTRACT

A motor vehicle hybrid panel assembly includes a body formed of a metallic sheet having multiple apertures created therein. At least one reinforcement member of a polymeric material is integrally connected to the body proximate to and surrounding at least two of the multiple apertures. At least one connecting member of the polymeric material is integrally connected to each of the at least one reinforcement member, and extends away from the at least two of the multiple apertures on the body. At least one joining member of the polymeric material is integrally connected to the at least one reinforcement member and integrally connected to the body.

21 Claims, 5 Drawing Sheets

MOTOR VEHICLE HYBRID SHELF ASSEMBLY

CROSS-REFERENCE TO RELATED APPLICATIONS

This application is a continuation of prior U.S. application Ser. No. 15/178,145 filed on Jun. 9, 2016, now U.S. Pat. No. 9,701,250. The entire disclosure of the above application is incorporated hereby by reference.

FIELD

The invention relates generally to a rear speaker mounting shelf for a motor vehicle.

BACKGROUND

The statements in this section merely provide background information related to the present disclosure and may or may not constitute prior art.

In common motor vehicle rear speaker mounting shelf structures, a single plate or multiple plates of steel material are joined typically by welding or fastening to outer frame structure of the vehicle, which are also commonly made of a steel material. Steel material is used for known speaker mounting shelf structures to provide structural strength to support features such as the loads imparted from rear seat belt retractors, seat back latches, deck lid hinges, speaker and woofer attachments and the like. Steel material similar to the material of the vehicle frame also allows welding of the shelf to vehicle frame connections.

While material coatings such as a polymeric coating applied onto the steel structural members are known which are relied on to reduce noise, polymeric material coatings applied to known speaker mounting shelf structures are not relied on for structural strength or stiffness. This field can therefore benefit from improved rear speaker mounting shelf structure designs.

SUMMARY

According to several aspects, a motor vehicle hybrid shelf assembly includes a body formed of a metallic sheet. A shelf of the body defines a plane having at least one aperture created therein. The at least one aperture is at least partially surrounded by a peripheral flange created from a portion of the shelf extending away from the plane defined by the shelf. A reinforcement member of a polymeric material is integrally connected to the peripheral flange.

In one aspect, the peripheral flange defines an L-shape having a first leg integrally connected to the body and oriented substantially parallel to the body, and a second leg angularly oriented with respect to the first leg.

In another aspect, the reinforcement member entirely covers the second leg.

In another aspect, the reinforcement member further covers a portion of the first leg.

In another aspect, the peripheral flange defines an S-shape having a first leg integrally connected to the body and angularly oriented with respect to the body, a second leg angularly oriented with respect to the first leg, and a third leg angularly oriented with respect to the second leg.

In another aspect, the reinforcement member entirely covers the third leg.

In another aspect, the reinforcement member further covers a portion of the second leg.

In another aspect, the reinforcement member covers an entire perimeter of the peripheral flange.

In another aspect, the reinforcement member is connected to the body by multiple integrally formed interlocks.

In another aspect, the body further includes opposed side portions adapted to be welded, riveted or fastened to a structure of the motor vehicle.

In another aspect, the body defines a metal material including one of aluminum and steel; and the side portions define a metal material including one of aluminum and steel and are fixed to the body.

According to further aspects, the body further includes a beam defining a reinforcing structure for the body.

In another aspect the beam is positioned proximate to a vehicle front facing portion of the body.

In another aspect, the body includes multiple second apertures each having a peripheral flange with a reinforcement member of a polymeric material integrally connected to each peripheral flange, and a rib connected to the body between the at least one aperture and each of the second apertures.

According to further aspects, a motor vehicle hybrid shelf assembly includes a body formed of a metallic sheet. A shelf of the body defines a plane having multiple apertures created therein. Each of the apertures is at least partially surrounded by a peripheral flange created from a portion of the shelf extending away from the plane defined by the shelf. A first leg of the peripheral flange of each of the apertures is integrally connected to the shelf and is angularly oriented with respect to the shelf. A second leg of the peripheral flange of each of the apertures is angularly oriented with respect to the first leg. A reinforcement member of a polymeric material is integrally connected to at least the second leg of the peripheral flange of each of the apertures.

In another aspect, the reinforcement member is also integrally connected to the first leg of the peripheral flange of each of the apertures.

In another aspect, multiple ribs are formed of the polymeric material of the reinforcement member. The ribs directly contact and extend away from a surface of the body and act to stiffen the body. The ribs extend between successive ones of the peripheral flanges and are integrally connected to the reinforcement member of the successive ones of the peripheral flanges and define an integrally extending member joined between multiple ones of the apertures.

In another aspect, opposed end portions of a ferrous material different than a material of the body are fixed to the body and are adapted to be welded to a structure of the motor vehicle, wherein the metallic sheet of the body is an aluminum material.

In another aspect, the polymeric material is adapted to be applied in an over-molding process and defines a fiber reinforced material.

According to further aspects, a motor vehicle hybrid shelf assembly includes a body is formed of a metallic sheet having multiple raised stiffening members. A shelf of the body defines a plane having multiple apertures created therein. Each of the apertures is at least partially surrounded by a peripheral flange created from a portion of the shelf extending away from the plane defined by the shelf. A first leg of the peripheral flange of each of the apertures is integrally connected to the shelf and is angularly oriented with respect to the shelf. A second leg of the peripheral flange of each of the apertures is angularly oriented with respect to the first leg. A reinforcement member of a polymeric material is integrally connected to at least the second leg of each peripheral flange. Multiple ribs are formed of the polymeric material. The ribs directly contact and extend away from a surface of the body and act to stiffen the body. The ribs extend between successive ones of the peripheral flanges and are integrally connected to the reinforcement member of the successive ones of the peripheral flanges and define an integrally extending member joined between multiple ones of the apertures.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
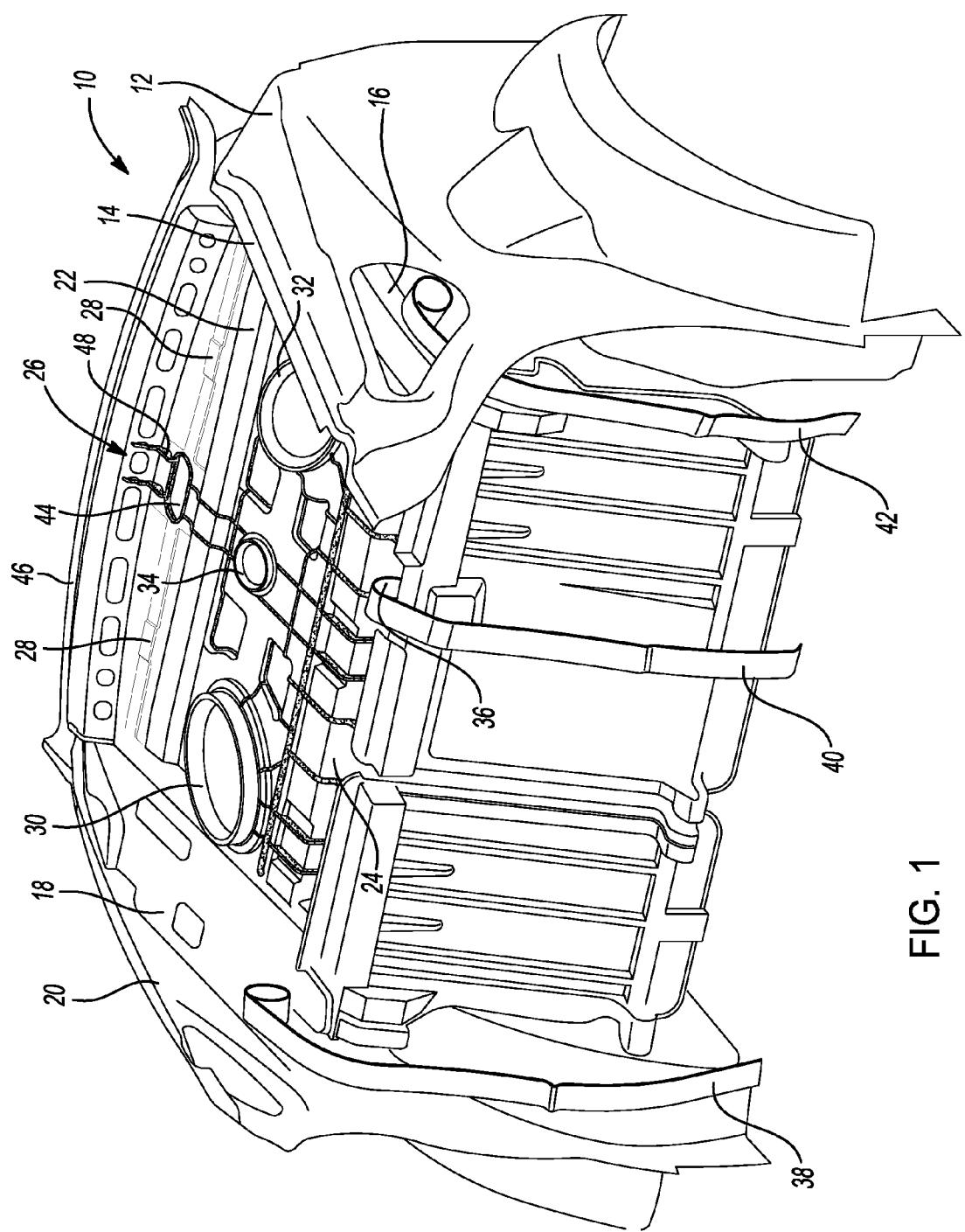
FIG. 1 is a front left perspective view of a motor vehicle hybrid shelf assembly having a of the present disclosure.

With reference to FIG. 1, a motor vehicle hybrid shelf assembly is generally indicated by reference number 10. According to several aspects, the hybrid shelf assembly 10 is a structural member of an exemplary motor vehicle frame 12 used in a motor vehicle (not shown). The hybrid shelf assembly 10 is connected for example by welding, fastening or riveting at a first end or side portion 14 to a first member 16 of the frame 12 and at an opposed second end or side portion 18 to a second member 20 of the frame 12. The hybrid shelf assembly 10 includes a main body 22 made of a metal including aluminum or steel. The body 22 can be formed for example by stamping and includes multiple integral reinforcing structures such as a front flange 24, a rear flange 26, multiple raised ribs 28, and the like. To facilitate fixing the first side portion 14 and the second side portion 18 directly to the frame 12 which is commonly a ferrous metal material such as steel, the first side portion 14 and the second side portion 18 can be fixed by welding, fastening, or riveting. According to several aspects the first side portion 14 and the second side portion 18 can also be formed of a metal material such as steel or aluminum.

The body 22 supports multiple components such as a first speaker 30, a second speaker 32, a woofer 34, and may also support other items (not shown) such as but not limited to seat belt retraction systems, wiring harnesses, tubing, ventilation components or ducting, and the like. One or more reel housings 36 can be fixed to the front flange 24, which are used to retract and store seat belts such as a first rear seat belt 38, a second rear seat belt 40, and a third rear seat belt 42. The front flange 24 and the body 22 are therefore designed to incorporate the stress and loading induced by the various seat belts, as well as the components supported by the body 22. The rear flange 26 can also be connected to a rear cowling 46 at a junction with a rear window of the vehicle (not shown). In addition of the use of a light weight metal such as aluminum to minimize weight of the body 22, multiple reinforcement members 48 of a polymeric material are integrally connected to the body 22 at various locations, such as where loading and vibration is induced by the weight of the speakers. According to several aspects, a material of the reinforcement members 48 is adapted to be applied in an over-molding process and defines a glass fiber reinforced material.

Referring to FIG. 2 and again to FIG. 1, the hybrid shelf assembly 10 includes multiple apertures, with each aperture positioned to locate one of the speakers (shown and described in reference to FIG. 1). For example a first aperture 50 is for locating the first speaker 30, a second aperture 52 for locating the second speaker 32, and a third aperture 54 for locating the woofer 34. Each of the first aperture 50, the second aperture 52 and the third aperture 54 can be reinforced by the addition of a raised peripheral flange created in the body 22, such as a first raised peripheral flange 56, which reinforces the first aperture 50. In addition, portions of the reinforcement members 48 are located at the perimeter of multiple ones of the body apertures, including a first reinforcement member 58 integrally connected to the first raised peripheral flange 56, and a second reinforcement member 60 integrally connected to a second raised peripheral flange 62 adjacent the second aperture 52. A third reinforcement member 64 is integrally connected to a peripheral flange adjacent to the third aperture 54.

With continuing reference to FIG. 2 and again to FIG. 1, in order to provide additional structural reinforcement for the body 22, the reinforcement members 48 can further include connecting members 66, which for example integrally connect the first reinforcement member 58 to the second reinforcement member 60. The connecting members 66 also provide an added benefit of allowing the first reinforcement member 58 and the second reinforcement member 60 to be simultaneously co-molded in a single injection molding "shot" of polymeric material, which reduces molding injection time, and reduces mold cost by reducing the quantity of molding gates required. The connecting members 66 can themselves be integrally connected using one or more joining members 68, which can be oriented at any angle with respect to the connecting members 66, but are preferably oriented substantially perpendicular to the connecting members 66. The joining members 68 are also integrally connected to the body 22, and are created during the same injection molding shot which forms the connecting members 66 and the reinforcement members 48.

Additional polymeric material reinforcement can be provided during the same molding shot to the front flange 24, using second joining members 70, which can be integrally connected to one or more of the connecting members 66. Additional apertures, such as for example an aperture 72, can be reinforced with the same polymeric material of the reinforcement members 48, but molded via a separate injection molding gate and a separate molding shot, and therefore providing a separate reinforcement member 74 about the perimeter of the aperture 72. Where structural features such as a beam 76 or a tube are incorporated into the body 22, separate polymeric material reinforcement can also be provided, such as by a reinforcement member 77. According to several aspects, the beam 76 is positioned proximate to a vehicle rear facing portion of the body 22.

Figure 2:
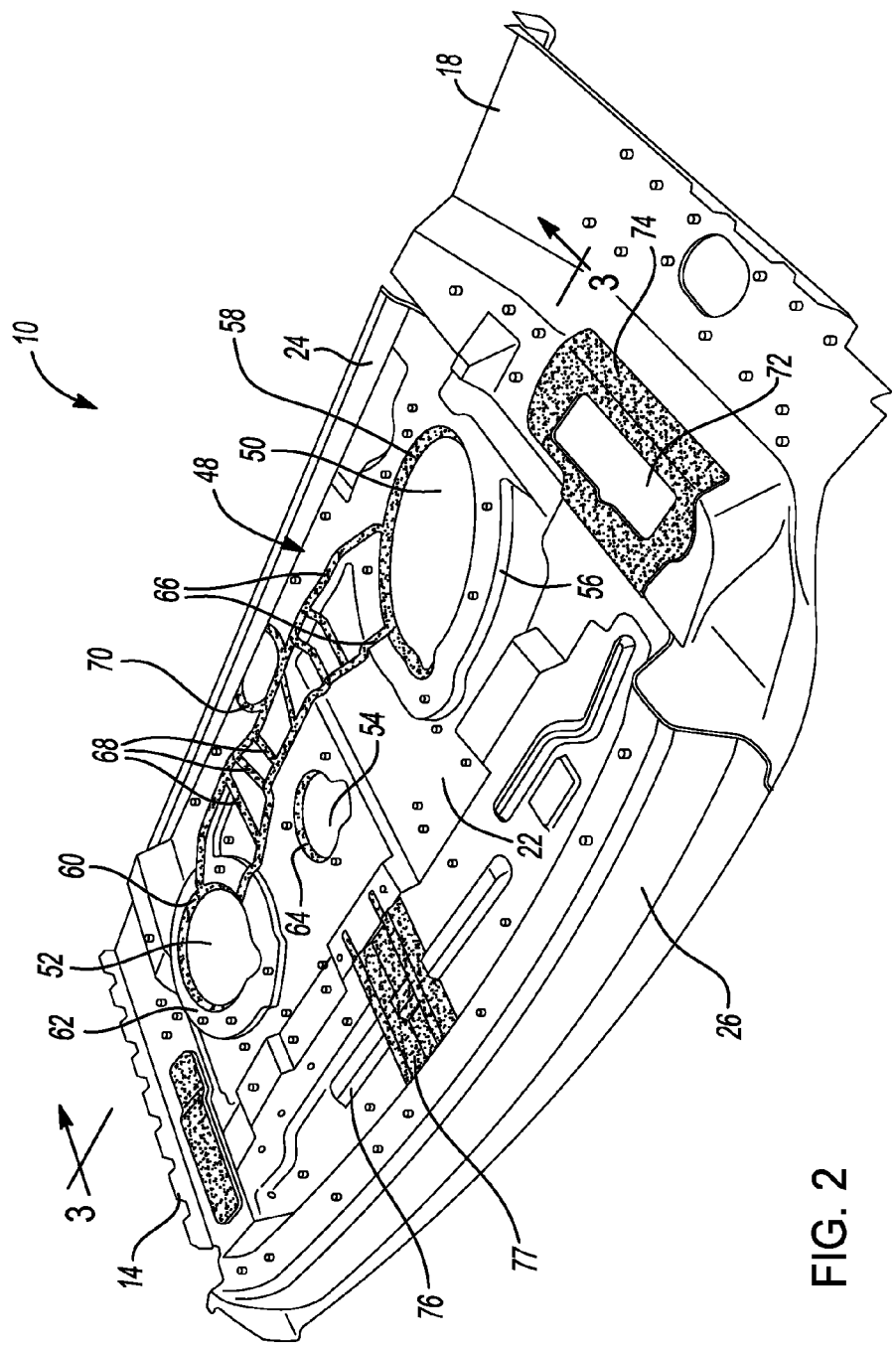
FIG. 2 is a bottom right perspective view of the hybrid shelf assembly of FIG. 1.

Referring to FIG. 3 and again to FIGS. 1 through 2, according to several aspects, the peripheral flange proximate one or more of the apertures can define an L-shape. For example, the peripheral flange 56 of the first aperture 50 defines an L-shape having a first leg 78 integrally connected to the body 22 and oriented substantially parallel to the body 22, and a second leg 80 angularly oriented with respect to the first leg 78. According to several aspects, the reinforcement member 58 entirely covers the second leg 80. According to further aspects, the reinforcement member 58 further covers a portion of the first leg 78. According to several aspects, any of the peripheral flanges can also define an S-shape, such as the peripheral flange 62 of the second aperture 52, which is described in greater detail in reference to FIG. 4.

A first shelf S1 of the body 22 defines a first plane "A" having the first aperture 50 created therein. A second shelf S2 of the body 22 defines a second plane "B" having the second aperture 52 created therein. As previously noted, each of the first aperture 50 and the second aperture 52 is at least partially surrounded by either the peripheral flange 56, or the peripheral flange 62 created from a portion of the shelf S1, S2 extending away from the plane "A" or "B" defined by the shelf. It is noted the first shelf S1 and the second shelf S2 are provided as exemplary aspects of the body 22, and that any planar portion of the body 22 can include an aperture, a channel, or another reinforcement feature having a polymeric material reinforcement member created about a perimeter of a peripheral flange of the aperture, or a reinforcement member extending away from the planar portion.

Figure 3:
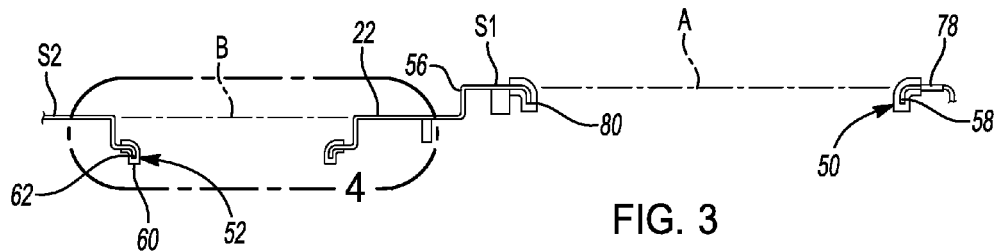
FIG. 3 is a cross sectional elevational view taken at section 3 of FIG. 2.
Figure 4:
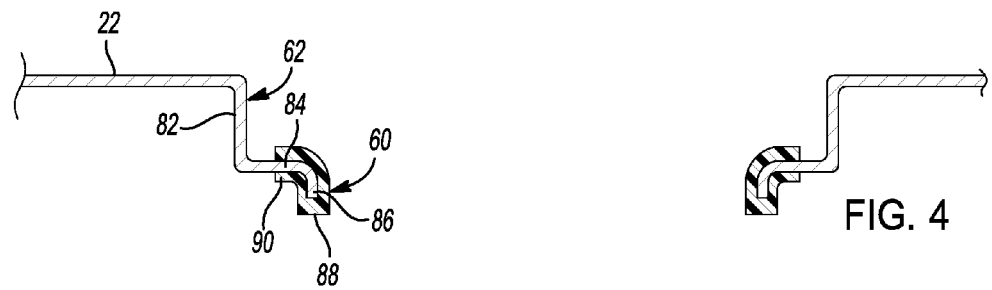
FIG. 4 is a cross sectional elevational view taken at area 4 of FIG. 3.

Referring now to FIG. 4 and again to FIG. 3, according to several aspects and as noted above, the peripheral flange 62 defines an S-shape. The peripheral flange 62 includes a first leg 82 integrally connected to the body 22 and angularly oriented with respect to the body 22, a second leg 84 angularly oriented with respect to the first leg 82, and a third leg 86 angularly oriented with respect to the second leg 84. According to further aspects, the reinforcement member 60 includes a first portion 88 entirely covering the third leg 86. According to additional aspects, the reinforcement member 60 further includes a second portion 90 that covers a portion of the second leg 84. According to further aspects, the reinforcement members 58, 60 can cover an entire perimeter of the peripheral flanges 56, 62.

Figure 5:
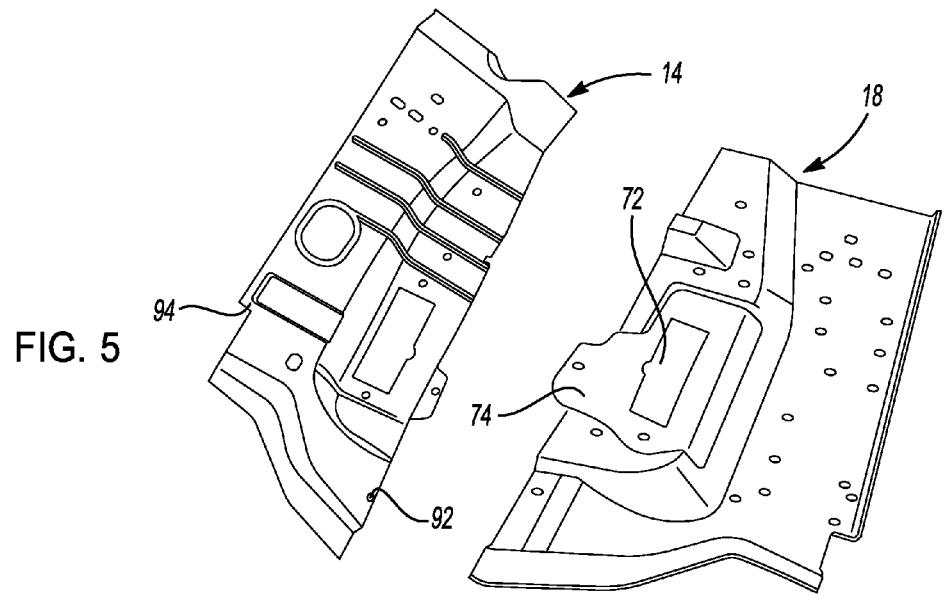
FIG. 5 is a bottom right perspective view of the first and second side portions of the hybrid shelf assembly of FIG. 1.

Referring to FIG. 5, and again to FIGS. 1 through 2, as previously noted the body 22 is predominantly made of an aluminum material and the opposed side portions 14, 18 are each formed of a ferrous material and are adapted to be fixed to the body, for example by fastening. Apertures 92 are provided for application of fasteners (not shown) used to join the first and the second side portions 14, 18 to the body 22. The first and the second side portions 14, 18 are provided of a ferrous material to suit welding of the first and the second side portions 14, 18 to the steel material frame 12 of the vehicle, and to minimize the interaction of dissimilar metals at these junctions. The first and the second side portions 14, 18 can also include polymeric material reinforcement members such as a plurality of reinforcement members 94, as well as the reinforcement member 74 provided about the perimeter of the aperture 72 previously described in reference to FIG. 2.

Referring to FIG. 6 and again to FIGS. 1 through 5, reinforcements members such as a reinforcement member 96 can be used to span externally facing angled surfaces such as a substantially planar surface 98 and a surface 100 which is oriented substantially perpendicular to surface 98. To assist in retaining the reinforcement members in integral contact with the body 22, each of the reinforcement members of the present disclosure can further include one or more interlocks 102, shown and described in greater detail in reference to FIG. 7. Reinforcement members such as a reinforcement member 104 can also be used to span internally facing angled surfaces such as a substantially planar surface 106 and a surface 108 which is oriented substantially perpendicular to surface 106. Additional reinforcement members such as a reinforcement member 110 can be used to integrally connect proximate reinforcement members, such as to connect the first reinforcement member 58 integrally connected to the first raised peripheral flange 56 to a reinforcement member 112 created at a raised perimeter of an aperture 114. Each reinforcement member directly contacts and extends away from a surface of the body 22 and stiffens the body 22.

Figure 6:
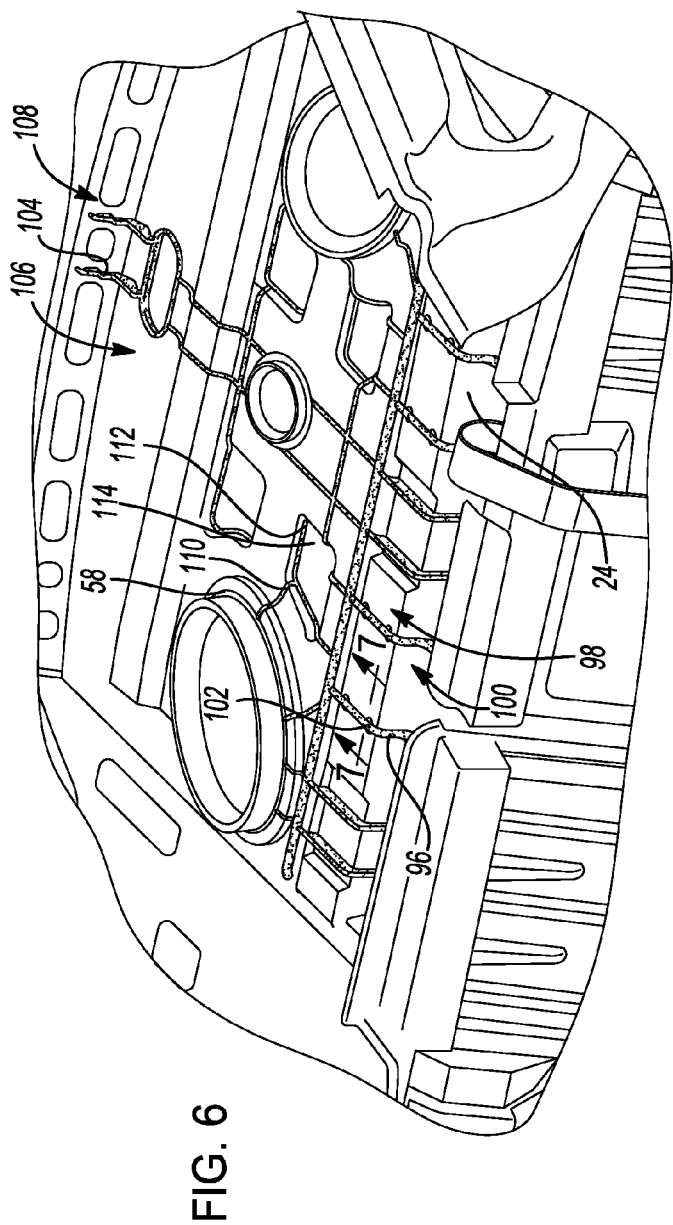
FIG. 6 is a front left perspective view of a motor vehicle hybrid shelf assembly of FIG. 1.
Figure 7:
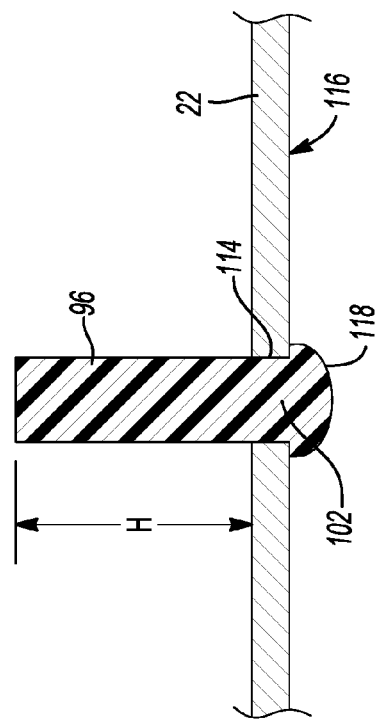
FIG. 7 is a cross sectional end elevational view taken at section 7 of FIG. 6.

Referring to FIG. 7 and again to FIG. 6, multiple interlocks such as the representative interlock 102 shown are integral portions of the multiple reinforcement members such as the reinforcement member 96 shown. Each interlock extends through an aperture 114 created in the body 22 or through a similar aperture create in one of the first or the second side portions 14, 18. Each of the interlocks can end flush with an opposite surface 116 of the panel they extend through, such as the body 22, or can have a bulbous-shaped button 118, which overlaps the surface 116 of the panel to thereby create a positive lock to prevent pullout of the interlock. A height "H" of any reinforcement member, such as the reinforcement member 96, can vary as necessary to provide additional localized stiffness to the body 22, or as necessary to span between adjacent reinforcement members.

Figure 8:
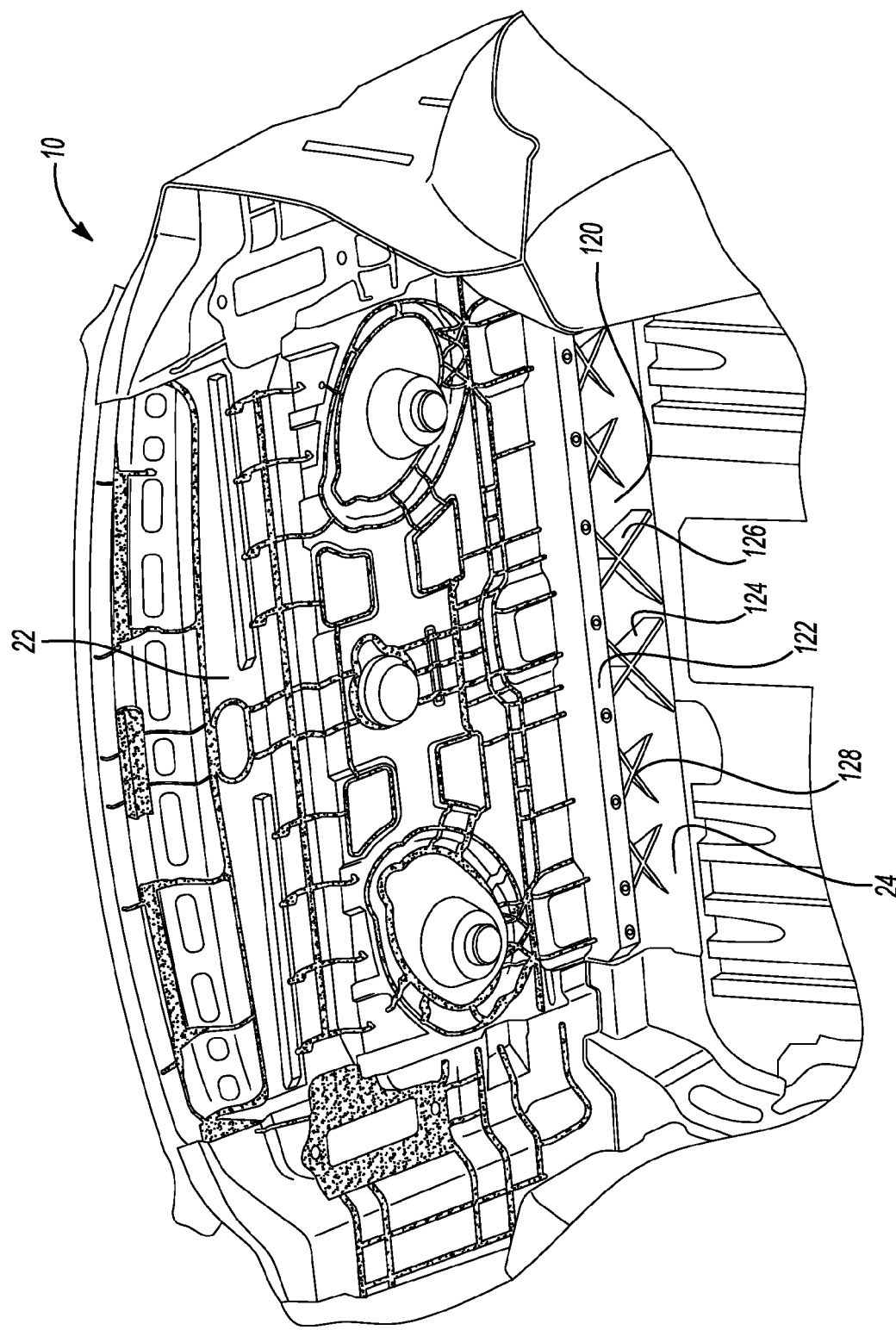
FIG. 8 is a bottom perspective view of the hybrid shelf assembly of FIG. 1.

Referring to FIG. 8 and again to FIG. 1, one or more reinforcement channels such as a U-shaped channel 120 can be created in the body 22, for example between the front flange 24 and a proximate flange 122. Additional polymeric material reinforcement members which define an X-shape, such as X-shaped reinforcement members 124, 126 can be injection molded and are integrally connected to each of the front flange 24 and the flange 122. Additional X-shaped reinforcement members, such as reinforcement members 128 can be either smaller or larger than the X-shaped reinforcement members 124, 126 to suit the stiffness requirements of body 22, particularly at areas such as the loading positions of the seat belt reel housings 36 (shown in FIG. 1).

According to several aspects, a motor vehicle hybrid shelf assembly 10 includes a body 22 formed of a metallic sheet. A shelf S1 of the body 22 defines a plane "A" having at least one aperture 50 created therein. The at least one aperture 50 is at least partially surrounded by a peripheral flange 56 created from a portion of the shelf extending away from the plane "A" defined by the shelf. A reinforcement member 58 of a polymeric material is integrally connected to the peripheral flange 56.

It is noted that items identified herein as being a stamping of a metal material can also be provided as cast, forged, or extruded structures. A motor vehicle hybrid shelf assembly 10 of the present disclosure offers several advantages, including the ability to tailor a structural performance of different model vehicle shelf assemblies for different structural loading requirements, different NVH (i.e., noise, vibration, harshness) requirements, and for different vehicle options that may impact the shelf assemblies. The use of the polymeric material reinforcement members as well as the use of aluminum material for substantial portions of the body provide for weight savings compared to an entirely steel shelf assembly.

The description of the invention is merely exemplary in nature and variations that do not depart from the gist of the invention are intended to be within the scope of the invention. Such variations are not to be regarded as a departure from the spirit and scope of the invention.

The following is claimed:

1. A motor vehicle hybrid panel assembly, comprising:
   a body formed of a metallic sheet having an aperture created therein, the aperture at least partially surrounded by a peripheral flange;
   a reinforcement member of a polymeric material integrally connected to the peripheral flange; and
   at least one connecting member of the polymeric material integrally connected to the reinforcement member and extending away from the peripheral flange on the body.

2. The motor vehicle hybrid panel assembly of claim 1, further including a second reinforcement member integrally connected to a second peripheral flange positioned proximate to a second aperture, wherein the at least one connecting member integrally connects the reinforcement member to the second reinforcement member.

3. The motor vehicle hybrid panel assembly of claim 2, wherein the at least one connecting member, the reinforcement member and the second reinforcement member are simultaneously co-molded in a single injection molding shot of the polymeric material.

4. The motor vehicle hybrid panel assembly of claim 2, wherein the at least one connecting member defines multiple connecting members.

5. The motor vehicle hybrid panel assembly of claim 4, further including at least one joining member, wherein the multiple connecting members are integrally connected by the at least one joining member.

6. The motor vehicle hybrid panel assembly of claim 2, wherein the reinforcement member and the second reinforcement member are angularly oriented with respect to the at least one connecting member.

7. The motor vehicle hybrid panel assembly of claim 2, wherein the reinforcement member and the second reinforcement member are oriented substantially perpendicular to the at least one connecting member.

8. The motor vehicle hybrid panel assembly of claim 5, wherein the at least one joining member is integrally connected to the body, and is created during the same injection molding shot which forms the multiple connecting members, the reinforcement member and the second reinforcement member.

9. The motor vehicle hybrid panel assembly of claim 1, wherein the peripheral flange defines an L-shape having a first leg integrally connected to the body and oriented substantially parallel to the body, and a second leg angularly oriented with respect to the first leg.

10. The motor vehicle hybrid panel assembly of claim 9, wherein the reinforcement member entirely covers the second leg.

11. The motor vehicle hybrid panel assembly of claim 10, wherein the reinforcement member further covers a portion of the first leg.

12. The motor vehicle hybrid panel assembly of claim 1, wherein the reinforcement member spans externally facing angled surfaces of the body.

13. The motor vehicle hybrid panel assembly of claim 2, wherein the reinforcement member and the second reinforcement member each define an X-shape.

14. The motor vehicle hybrid panel assembly of claim 2, wherein the reinforcement member and the second reinforcement member directly contact and extend away from a surface of the body and thereby stiffen the body.

15. The motor vehicle hybrid panel assembly of claim 1, wherein the body further includes side portions welded, riveted or fastened to a motor vehicle.

16. The motor vehicle hybrid panel assembly of claim 15, wherein the side portions define a metal material including one of aluminum and steel and are fixed to the body.

17. A motor vehicle hybrid panel assembly, comprising:
    a body formed of a metallic sheet having multiple apertures created therein;
    at least one reinforcement member of a polymeric material integrally connected to the body proximate to and surrounding at least two of the multiple apertures;
    at least one connecting member of the polymeric material integrally connected to the at least one reinforcement member, and extending away from the at least two of the multiple apertures on the body; and
    at least one joining member of the polymeric material integrally connected to the at least one reinforcement member and integrally connected to the body.

18. The motor vehicle hybrid panel assembly of claim 17, further including multiple interlocks each defining an integral portion of the at least one reinforcement member, each of the multiple interlocks extending through one of multiple apertures created in the body to mechanically connect the at least one reinforcement member to the body.

19. The motor vehicle hybrid panel assembly of claim 17, further including multiple ribs formed of the polymeric material of the at least one reinforcement member, the multiple ribs directly contacting and extending away from a surface of the body and thereby to stiffen the body.

20. The motor vehicle hybrid panel assembly of claim 17, wherein each of the multiple apertures is at least partially surrounded by a peripheral flange, the at least one reinforcement member being integrally connected to the peripheral flange.

21. The motor vehicle hybrid panel assembly of claim 17, wherein the polymeric material is applied in a single shot using an over-molding process.

* * * * *